Patented Sept. 15, 1925.

1,554,183

UNITED STATES PATENT OFFICE.

MAJOR E. HOLMES AND GAIL J. FINK, OF WASHINGTON, DISTRICT OF COLUMBIA, ASSIGNORS TO NATIONAL LIME ASSOCIATION, OF WASHINGTON, DISTRICT OF COLUMBIA, A CORPORATION OF DISTRICT OF COLUMBIA.

PRODUCTION OF QUICK-SETTING LIME PRODUCTS BY THE ADDITION OF AN ALUMINUM FLUORIDE.

No Drawing.  Application filed May 22, 1923. Serial No. 640,771.

*To all whom it may concern:*

Be it known that MAJOR E. HOLMES and GAIL J. FINK, citizens of the United States, residing at Washington, District of Columbia, have invented certain new and useful Improvements in the Production of Quick-Setting Lime Products by the Addition of an Aluminum Fluoride, of which the following is a specification.

Our invention relates to the production of plastic materials which have quick initial setting properties and which are adapted to be used in the making of mortars, plasters, shaped articles such as blocks and the like.

The use of calcined gypsum for plastering purposes is well known. Gypsum sets so quickly that it is necessary to add varying proportions of a retarding agent to delay the set sufficiently to allow the workmen time to get the plaster on the wall. In addition to this objection, gypsum has a number of other serious objections and disadvantages. For example, the material is difficult to work, owing to its lack of plasticity and, as compared to lime, its low sand-carrying capacity. Large quantities of lime are used for plastering purposes but in using this material it is necessary to wait a considerable period of time—twenty to twenty-four hours—for each coat to acquire what may be termed its initial set, by which it becomes sufficiently strong, firm and dry so that the succeeding coat may be applied. This is quite a serious objection since it requires the removal of scaffolds from one room to another between the application of the various coats, if the workmen are not to suspend work entirely.

We have found that quick initial setting properties may be imparted to plastic materials such as lime and thereby the latter may be successfully used for plastering purposes and for the production of mortars, blocks and the like.

We have found that by mixing with ordinary hydrated lime or lime putty, varying percentages of an aluminum fluoride, preferably finely ground, the lime acquires quick initial setting properties.

The term "initial set" is used to indicate that condition of the lime plaster which makes it suitable for the application of the second or brown coat. It is not necessarily hard in this condition, but is firm, strong and rigid enough to support the weight of the second coat and withstand the pressure necessary in the application of the second coat. This is distinguished from the term "hardening" in that the latter refers to the condition of the mortar after it has undergone practically all the physical and chemical changes that it will undergo and has developed a strength near its maximum strength.

Ordinarily, lime mortar does not harden to the final condition of hardness for a great many months and in some cases a number of years, whereas the initial set occurs in about 20 hours when using standard sanded lime mortar, and in our mortar, the initial set is so quickened as to occur in 9 hours and in some cases, in even less time. The term, "quick initial set" is used to distinguish between slow setting lime mortar which requires about twenty hours to acquire its initial set and our material which sets in less than one-half of this time. It may set in six hours, nine hours or twenty-five minutes depending on the type and percentage of aluminum fluoride used. We do not desire to set any definite limit as to the time it takes our material to acquire its initial set as this will depend on the character of the lime and the type and percentage of aluminum fluoride used. The term "set" is sometimes used indiscriminately as synonymous with hardness. When so used, it is, of course, clear that the final hardness of the material is referred to.

We have used the standard Gillmore needle in testing for the set of lime mortar. We find that when the heavily weighted Gillmore needle penetrates to a distance of 2 m. m. in the pat the mortar has assumed its set, that is it is in a condition to receive the second coat. This relation between the penetration of the needle and its suitability for the second coat, has been checked up by practical plasterers.

Among the aluminum fluorides which we may use are cryolite, which is a naturally occurring double fluoride, aluminum fluoride, sodium aluminum fluoride, potassium aluminum fluoride and the like.

As a specific example, illustrative of our invention the following is given: A suitable plaster may be prepared by mixing 5% of cryolite with a 1:3 lime mortar mix, that is, one part of dry hydrated lime and three parts of sand, and adding the requisite amount of water or its equivalents. Such a plaster will set sufficiently in 9 hours to permit the application of a second coat. A similar plaster to which cryolite has not been added will require 22½ hours to set and dry to the same degree. The time of set may be increased or decreased by regulating the quantity of the addition agent. It may be desirable for certain purposes to retard the time of set and this may be accomplished by the addition of suitable retarders such as glue, casein, dried blood, ground tankage and the like. The following table gives in tabular form the periods of set of a 1:3 lime mortar obtained in comparative tests, with and without the addition agents:

| Addition agent | Per cent added | Time of set |
|---|---|---|
|  |  | Hrs. Min. |
| Hydrated lime alone |  | 22  30 |
| Cryolite | 5 | 9  00 |
| Cryolite | 10 | 6  00 |
| Cryolite | 20 | 0  25 |

The percentage of addition agent added is calculated on the combined weight of the lime and addition agent. For example, 5% cryolite means 5 parts of cryolite and 95 parts lime.

In the above example, the materials forming the plaster mix are mixed in a dry state and there is no reaction between mix constituents until after water is added. Proceeding in this manner the accelerating agent, lime and other ingredients may be mixed at the place of manufacture and thereby a prepared dry plaster mix sent to the trade which requires only the addition of water to be immediately available for use. We do not however, desire to be limited to this particular method of preparation. Comparable results are obtained by adding the fluoride to a putty made from hydrated lime or by the slaking of quicklime.

Certain more soluble samples of cryolite may produce a very slight efflorescence or incrustation on the finished product which has been exposed to an excessively humid atmosphere. The efflorescence may be reduced or prevented by the addition to the mortar of small percentages of materials which will react with the sodium hydroxide or other soluble salts, produced by the reaction of the fluoride on the calcium hydroxide, to form insoluble or less soluble compounds. Among the agents effective in reducing efflorescence are lead acetate, lead oxide, zinc oxide or hydroxide, antimony oxides, glue, and the like.

It is obvious that together with the fluoride other addition agents may be added to confer desirable properties upon the finished product. For example, for certain kinds of masonry work, it may be very desirable to make a strong mortar, and in that case Portland cement may be added to the lime and fluoride mix. Again, it may be desirable to make very dense products which may be accomplished by taking advantage of the shrinkage of lead compounds, which also, as heretofore stated, tend to eliminate efflorescence.

The term, "hydrated lime" as used in the specification and claims includes the various kinds of commercial hydrated lime which may vary considerably in its composition. It is intended to include thereunder both calcium and dolomitic hydrated lime. In addition, we intend to cover by this term, dry hydrated lime which is a definite article of commerce or lime putty which may be made from the dry hydrated lime or from quick lime.

It is obvious that hair, asbestos or similar materials may be added to the lime-fluoride mix.

We claim:

1. A plastic material having quick initial setting properties comprising hydrated lime and an aluminum fluoride.

2. A plastic material having quick initial setting properties comprising hydrated lime and a double fluoride of aluminum and another metal.

3. A plastic material having quick initial setting properties comprising hydrated lime and cryolite.

4. A plastic material having quick initial setting properties comprising hydrated lime, a retarder and an aluminum fluoride.

5. A plastic material having quick initial setting properties comprising hydrated lime, a retarder and a double fluoride of aluminum and an alkali metal.

6. A plastic material having quick initial setting properties comprising hydrated lime, a retarder and cryolite.

7. A plastic material having quick initial setting properties comprising hydrated lime, a deefflorescing agent and an aluminum fluoride.

8. A plastic material having quick initial setting properties comprising hydrated lime, a deefflorescing agent and cryolite.

9. A plastic material having quick initial setting properties comprising hydrated lime, a retarder, a deefflorescing agent and an aluminum fluoride.

10. A plastic material having quick initial setting properties comprising hydrated lime, a retarder, a deefflorescing agent and cryolite.

11. A prepared plaster mix having quick initial setting properties comprising hydrated lime and an aluminum fluoride.

12. A prepared plaster mix having quick initial setting properties comprising hydrated lime and a double fluoride of aluminum and an alkali metal.

13. A prepared plaster mix having quick initial setting properties comprising hydrated lime and cryolite.

14. A prepared plaster mix having quick initial setting properties comprising hydrated lime, a retarder and an aluminum fluoride.

15. A prepared plaster mix having quick initial setting properties comprising hydrated lime, a retarder and a double fluoride of aluminum and an alkali metal.

16. A prepared plaster mix having quick initial setting properties comprising hydrated lime, a retarder and cryolite.

17. A prepared dry plaster mix having quick initial setting properties comprising hydrated lime and an aluminum fluoride.

18. A prepared dry plaster mix having quick initial setting properties comprising hydrated lime and cryolite.

19. A plastic material having quick initial setting properties comprising hydrated lime and a double fluoride of aluminum and and alkali metal.

20. The process of producing a plastic material having quick initial setting properties comprising mixing hydrated lime with an aluminum fluoride in the presence of water.

21. The process of producing a plastic material having quick initial setting properties comprising mixing hydrated lime with double fluoride of aluminum and another metal in the presence of water.

22. The process of producing a plastic material having quick initial setting properties comprising mixing hydrated lime with a double fluoride of aluminum and an alkali metal.

23. The process of producing a plastic material having quick initial setting properties comprising mixing hydrated lime with cryolite in the presence of water.

24. The process of producing a plastic material having quick initial setting properties comprising mixing hydrated lime with an aluminum fluoride in the presence of water and allowing the material to set.

In testimony whereof they hereunto affix their signatures.

MAJOR E. HOLMES.
GAIL J. FINK.